United States Patent
Jajtic et al.

(10) Patent No.: US 7,737,597 B2
(45) Date of Patent: Jun. 15, 2010

(54) TOOTHED MODULE FOR PRIMARY PARTS OF PERMANENT-MAGNET SYNCHRONOUS MOTORS

(75) Inventors: Zeljko Jajtic, München (DE); Gerhard Matscheko, Starnberg (DE); Stefan Schiele, Stetten (DE); Wolfgang Wolter, Herbertshausen (DE)

(73) Assignee: Siemens Aktiengesellschaft, Munich (DE)

( * ) Notice: Subject to any disclaimer, the term of this patent is extended or adjusted under 35 U.S.C. 154(b) by 90 days.

(21) Appl. No.: 12/067,765

(22) PCT Filed: Aug. 11, 2006

(86) PCT No.: PCT/EP2006/065259

§ 371 (c)(1),
(2), (4) Date: Mar. 21, 2008

(87) PCT Pub. No.: WO2007/033871

PCT Pub. Date: Mar. 29, 2007

(65) Prior Publication Data

US 2009/0039717 A1    Feb. 12, 2009

(30) Foreign Application Priority Data

Sep. 22, 2005    (DE) .................. 10 2005 045 347

(51) Int. Cl.
*H02K 37/02*    (2006.01)
(52) U.S. Cl. .................. 310/216.008; 310/216.009; 310/216.022; 310/216.032; 310/216.128; 310/216.131
(58) Field of Classification Search .............. 310/181, 310/12, 218, 46, 216.008, 216.009, 216.022, 310/216.032, 216.128; *H02K 37/02*
See application file for complete search history.

(56) References Cited

U.S. PATENT DOCUMENTS

| 1,756,672 A | 4/1930 | Barr |
| 6,262,508 B1 * | 7/2001 | Shibayama et al. ......... 310/181 |

(Continued)

FOREIGN PATENT DOCUMENTS

| DE | 195 27 324 A1 | 1/1997 |
| DE | 196 08 286 A1 | 8/1997 |

(Continued)

OTHER PUBLICATIONS

A Novel High-Torque Reluctance Motor with Rare-Earth Magnet; Iwabuchi N. et al.:IEEE Transactions on Industry Applications, IEEE Service Center, Piscataway, New York. USA, Bd. 30, Nr. 3, May 1, 1994, Seiten 609-613; XP000459019.

*Primary Examiner*—Quyen Leung
*Assistant Examiner*—Terrance Kenerly
(74) *Attorney, Agent, or Firm*—Henry M. Feiereisen; Ursula B. Day

(57) ABSTRACT

The invention relates to a module (6) for primary parts (12) of synchronous motors (7, 8, 13) which are excited by permanent magnets, which comprise at least one secondary part (9) which is at least sectionally devoid of permanent magnets. Said secondary part (9) is made of an iron structure comprising teeth (11) which leads to the primary part (12). Said R module (6) comprises at least one permanent magnet (1, 14) and at least one iron rod (2) which is arranged on the opposite sides. Recesses (3) are arranged between the iron rod (2) on one side and at least one winding (5) is guided about the iron rod (2). An additional module (6) can be secured at least to one side of the module (6) such that the iron rod (2) engages in the recesses (3) of the adjacent module (6) and the modules (6) can be placed together in relation to various predetermined primary parts (12).

17 Claims, 2 Drawing Sheets

U.S. PATENT DOCUMENTS

| | | |
|---|---|---|
| 2003/0057796 A1 | 3/2003 | Fan |
| 2003/0102759 A1* | 6/2003 | Shah et al. ................ 310/181 |
| 2005/0104461 A1* | 5/2005 | Hatz et al. ................ 310/67 |

FOREIGN PATENT DOCUMENTS

| | | |
|---|---|---|
| DE | 199 14 943 C1 | 8/2000 |
| DE | 696 09 807 T2 | 3/2001 |
| DE | 10 2004 005 706 A1 | 8/2004 |
| GB | 747 587 A | 4/1956 |
| GB | 23 66 085 A | 2/2002 |
| JP | 2002-199679 A | 7/2002 |
| JP | 2004-320878 A | 11/2004 |
| JP | 2005-095000 A | 4/2005 |
| WO | WO 02/47237 A1 | 6/2002 |
| WO | WO 03/055036 A1 | 7/2003 |
| WO | WO 03/058794 A1 | 7/2003 |

* cited by examiner

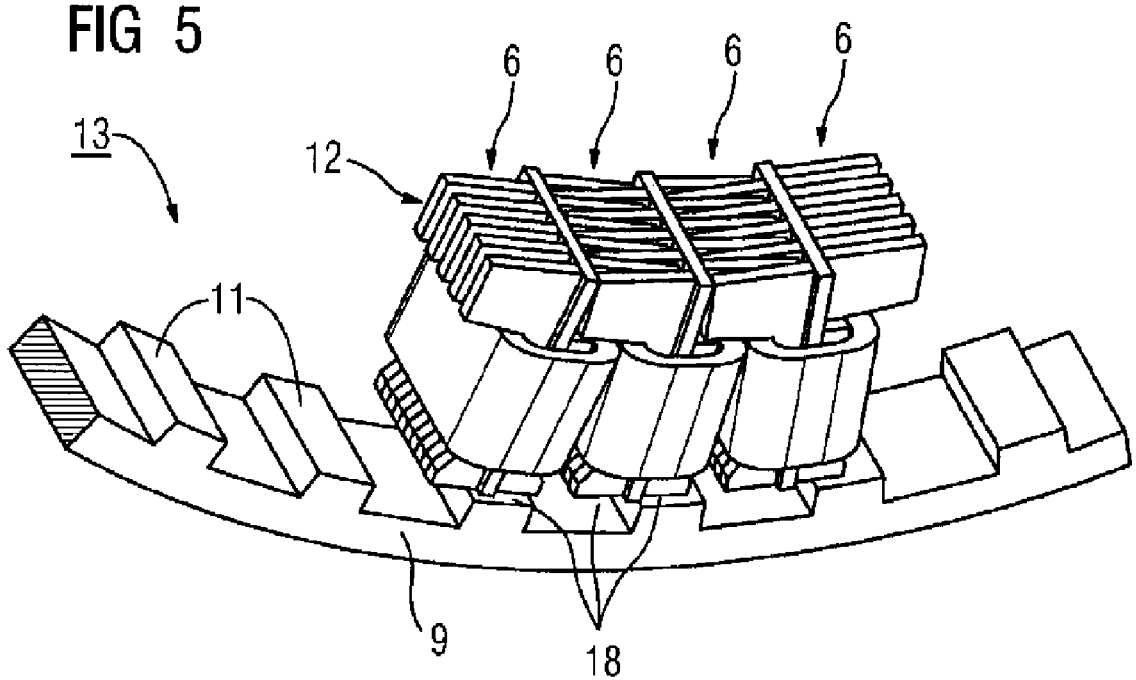
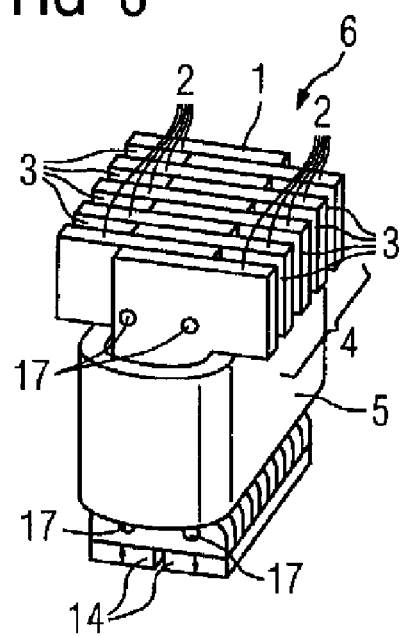 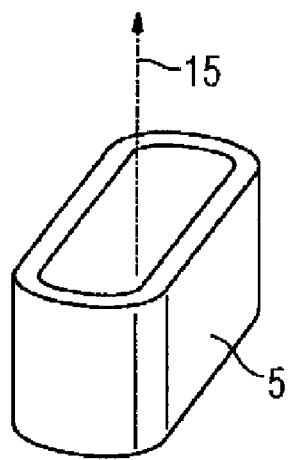

TOOTHED MODULE FOR PRIMARY PARTS OF PERMANENT-MAGNET SYNCHRONOUS MOTORS

BACKGROUND OF THE INVENTION

The invention relates to a toothed module for primary parts of permanent-magnet synchronous motors.

Electrical machines are used in a very large number of technical fields. In the case of electrical machines it is necessary to distinguish between DC machines, AC machines and three-phase machines. Three-phase machines can be split into three-phase synchronous machines and three-phase asynchronous machines.

A type of embodiment of electrical machines is permanent-magnet synchronous motors. These comprise a primary part and a secondary part. The primary part is active and the secondary part acts passively.

It is known what kind of construction is necessary for permanent-magnet synchronous motors in order to meet various use requirements. Different types of uses can in this case result from the physical space available, the permissible weight or the required power.

However, one disadvantage is the fact that the primary part and the secondary part need to be reconstructed in order to produce a new permanent-magnet synchronous motor which is matched to a new design. Possible designs are in this case, for example, linear motors or rotary motors.

SUMMARY OF THE INVENTION

The invention is based on the object of indicating how primary parts for different and simplified permanent-magnet synchronous motors can be manufactured with a modular design, so that the construction of the permanent-magnet synchronous motors according to the invention is comparatively less expensive.

This object is achieved according to the invention by a toothed module for primary parts of permanent-magnet synchronous motors, which have at least one secondary part, at least sections of which are free of permanent magnets, the secondary part being constructed from a structure consisting of iron with successive teeth pointing towards the primary part, and an air gap being located between the primary part and the secondary part, and the secondary part and the primary part being capable of moving relative to one another in at least one movement direction or else in the opposite direction thereto, the toothed module having at least one permanent magnet,
the toothed module having, on opposite sides, which are positioned in the movement direction or in the opposite direction thereto, in each case at least one iron web, which is at right angles with respect to the air gap,
cutouts being provided between iron webs on one side,
at least one coil being guided around the iron webs, the coil axis of said coil being at right angles with respect to the air gap,
at least one iron web protruding to a lesser extent in a region which is surrounded by a coil than in a region which is further away from the air gap,
it being possible for a further toothed module to be fixed on at least one side of a toothed module, so that the iron webs each engage in the cutouts of the adjacent toothed module and the toothed modules can thus be joined together to form different predeterminable primary parts.

Furthermore, the object is achieved by a permanent-magnet synchronous motor according to the invention and by a method for the modular construction of primary parts of permanent-magnet synchronous motors.

This advantageously makes it possible to achieve a situation in which a large number of primary parts for permanent-magnet synchronous motors with a secondary part which is free of permanent magnets can be formed from few toothed modules. Advantageously, the manufacturing costs, as well as the construction times of new permanent-magnet synchronous motors with a secondary part which is free of permanent magnets are thereby reduced. A preferred embodiment is in this case that in which the secondary parts of the permanent-magnet synchronous motor are constructed in such a way that they are free of permanent magnets. That is to say that the permanent-magnet synchronous motor then has secondary parts which are free of permanent magnets.

The secondary part, at least sections of which are free of permanent magnets, is preferably constructed in such a way that it is completely free of permanent magnets. However, embodiments are also conceivable in which permanent magnets are also used in the secondary part, in this case, for example, regions of the secondary part which correspond to a pole pitch angle remaining free of permanent magnets.

A first advantageous embodiment results if the toothed module has at least one permanent magnet, which is adjoined by at least in each case one iron web from each of the two sides. Then, the magnetic flux can be guided in optimum fashion from the permanent magnet into the iron webs. Furthermore, this embodiment can be optimized if at least one coil also at least partially surrounds the permanent magnet. In this case, the permanent magnet is advantageously magnetized at right angles with respect to the air gap.

A second embodiment results if at least two iron webs of opposite sides of the toothed module overlap one another. In this case, the magnetic flux is advantageously guided directly over the iron webs from one side to the other.

In particular in a second embodiment, the toothed module can be constructed in such a way that the toothed module has two groups of permanent magnets comprising in each case at least one permanent magnet, the permanent magnets of one group having the same polarization and the groups having different magnetization directions, but the magnetization direction in the case of both groups being at right angles with respect to the air gap, and the groups being arranged on opposite sides, which are positioned in the movement direction or in the opposite direction thereto, on the face which faces the air gap of the permanent-magnet synchronous motor. This can be realized by, for example, one group comprising in each case one permanent magnet, which is fitted on the face which faces the air gap, so that in each case one permanent magnet is positioned beneath one side of iron webs. The magnetization direction is therefore at right angles with respect to the air gap in the case of the permanent magnets of both groups.

A further advantageous configuration results if at least one iron web is constructed from at least one laminate. This advantageously reduces eddy currents. Advantageously, all the iron webs can each be constructed from laminate stacks.

The toothed modules are manufactured in such a way that they can be joined together to form primary parts of linear motors and to form primary parts of motors with a rotating rotor. Accordingly, only one type of toothed module therefore needs to be designed and manufactured. It is then advantageously possible for the primary parts of different motor types to be manufactured from this type.

Further advantageous configurations result if the toothed modules can be joined together to form a primary part of a segment motor, torque motor or else a toroidal motor. A segment motor in this case characterized by the fact that it has a toroidal rotor, but the stator is only constructed from segments, which, when taken together, do not completely surround the rotor. A segment motor could therefore have two stator segments which, for example, cover in each case only 30° of the rotor instead of surrounding the rotor through 360° in the rotation direction. In this case, the segments can be formed from primary parts, and the secondary part forms the toroidal rotor. In the case of a toroidal motor, on the other hand, the rotor and the stator are toroidal. A torque motor, on the other hand, is characterized by the fact that the torque applied on the motor shaft is used for the respective application without being transmitted by a transmission. The secondary part can generally be in the form of an internal rotor or else in the form of an external rotor.

Advantageously, the secondary part is constructed from laminate stacks in order to reduce eddy current losses. Furthermore, the iron webs are fitted on the permanent magnet in such a way that a cutout is positioned opposite each iron web on the other side of the permanent magnet. Then, the toothed modules can be joined together so that there is no lateral offset between the toothed modules.

The coils can be applied to the toothed modules by them being plugged on or by wire being wound onto the toothed module. In order to make it easier to plug them on, the iron webs are shifted towards one another, with the result that the cross section in the foot region of the toothed module is reduced and then they are brought into the end positions again. Then, the iron webs are fixed by means of bolts.

Advantageously, magnetizable material is fixed on the toothed module and then magnetized, so that the permanent magnets result. This means that all the component parts of a toothed module can be joined together more easily since the magnetizable material is not yet magnetized at the time at which they are joined together.

BRIEF DESCRIPTION OF THE DRAWING

The invention and further advantageous configurations of the invention in accordance with the features of the dependent claims will be explained in more detail below with reference to schematically illustrated exemplary embodiments in the drawing, without the invention thereby being restricted to these exemplary embodiments; in the drawing:

FIG. 5 shows a further segment motor, whose primary part comprises toothed modules according to the invention;

FIG. 6 shows a further toothed module according to the invention; and

FIG. 7 shows a coil.

DETAILED DESCRIPTION OF PREFERRED EMBODIMENTS

Figure 1:
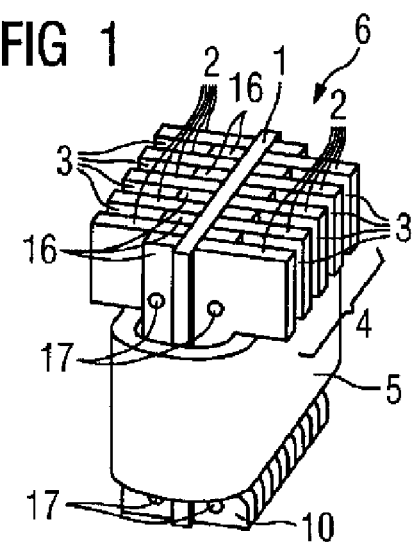
FIG. 1 shows a toothed module according to the invention.

FIG. 1 shows a toothed module 6 according to the invention. The toothed module 6 comprises at least one permanent magnet 1, on which in each case at least one iron web 2 is fitted on opposite sides, cutouts 3 being provided between the iron webs 2 on one side, and at least one coil 5 being guided around the permanent magnet 1 and the iron webs 2. In this case, the coil can be energized. The iron webs 2 are fitted on the permanent magnet 1 in such a way that a cutout 3 is positioned opposite each iron web 2 on the other side of the permanent magnet 1. In FIG. 1, precisely five iron webs 2 are fitted on each side of the permanent magnet 1, so that a width 4 of the toothed module 6 results. It is also conceivable for only one iron web 2 to be located on at least one side of the permanent magnet 1. In the case of only one iron web 2 on one side, the free space on both sides of the iron web corresponds to the cutouts 3. The iron webs can optionally have a foot 10, which protrudes from the toothed module 6 and, inter alia, prevents the coils 5 from sliding off from the toothed module 6. Bolts 17 are provided in the region of the feet 19 in order to stabilize the toothed module 6.

Advantageously, relatively small iron webs 16 are fixed between the iron webs 2 in the cutouts 3, as shown in FIG. 1, with the result that the stability of the toothed module 6 is increased since the relatively small iron webs 16 bear against the iron webs 2. In order to further stabilize the toothed module 6, bolts 17 are plugged through the iron webs 2 and through the relatively small iron webs 16 positioned therebetween on each side.

The iron webs 2 and also the relatively small iron webs 16 in the cutouts 3 bear against the permanent magnet 1. Furthermore, it can be seen in FIG. 1 that the iron webs 2 protrude to a lesser extent from the toothed module 6 in a region which is surrounded by a coil 5 than in a region which is further away from the air gap 18.

Figure 3:
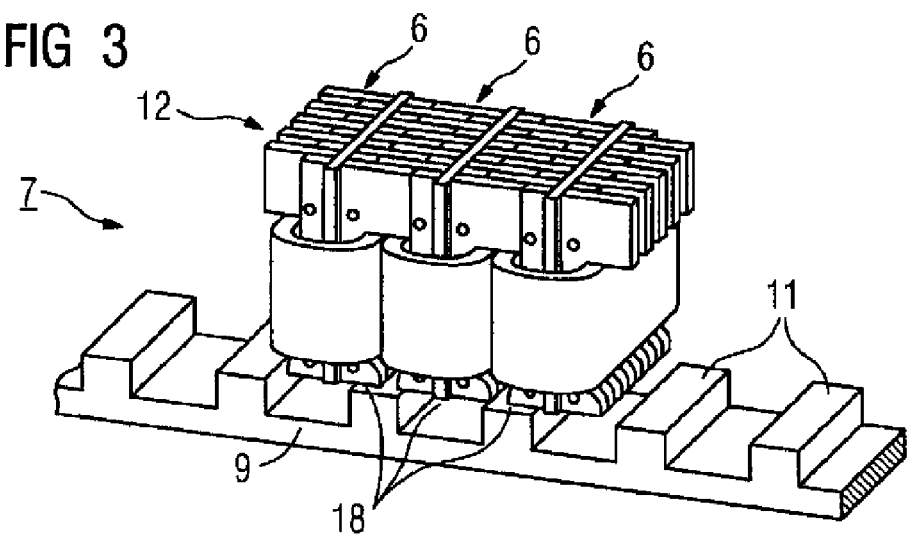
FIG. 3 shows a linear motor, whose primary part comprises toothed modules according to the invention.
Figure 4:
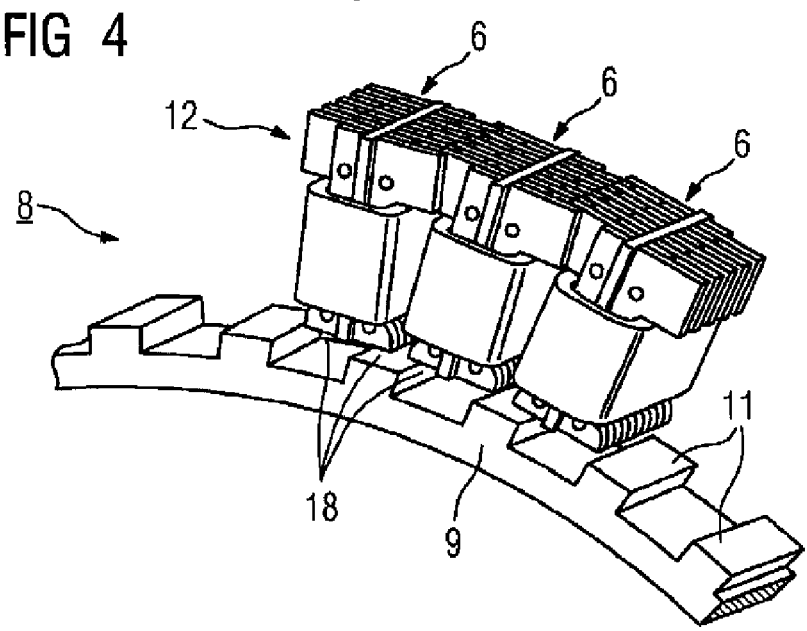
FIG. 4 shows a segment motor, whose primary part comprises toothed modules according to the invention.

The position of the air gap 18 is illustrated in FIG. 3. As a result of the iron webs 2 which protrude from a toothed module 6, it is now possible to join a plurality of toothed modules 2 together and to ensure comparatively effective conduction of the magnetic flux. It can also be seen in FIG. 1 that the iron webs 2 protrude to a lesser extent from the toothed module 6 in a region which is surrounded by a coil 5 than in a region which is positioned closer to the air gap 18. In this case, the iron webs 2 can generally be made from a material which can conduct the magnetic flux well, such as metallic materials, for example. Each iron web 2 can be produced from at least one laminate, for example. That is to say it is possible to construct an iron web 2 from a plurality of laminates in the form of a laminate stack or else only from one piece of laminate.

Figure 2:
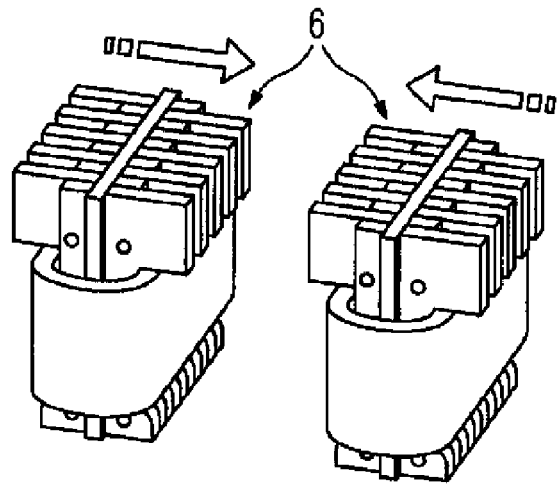
FIG. 2 shows two toothed modules according to invention when joined together.

FIG. 2 shows two toothed modules 6 according to the invention when joined together. Accordingly, the iron webs 2 of a toothed module 6 each engage in the cutouts 3 of the adjacent toothed module 6, so that the iron webs 2 of adjacent toothed modules 6 come into contact at their sides. The joined-together toothed modules 6 can then additionally be secured, for example by means of adhesive bonds or screw connections.

FIG. 3 illustrates a permanent-magnet synchronous linear motor 7 with a secondary part 9 which is free of permanent magnets, the primary part 12 of said motor comprising toothed modules 6 according to the invention. As can be seen in this exemplary embodiment, in this case the toothed modules 6 are joined together directly adjacent to one another, so that those ends of the toothed modules 6 which point towards the secondary part 9 lie in the same plane. The secondary part 9 is constructed from a structure consisting of iron with teeth 11 pointing towards the primary part 12. In this case, an air gap 18 is provided between the primary part 12 and the secondary part 9. The interspace between the teeth 11 of the secondary part 9 can optionally also be filled by a nonmagnetic material.

As a result of the fact that the iron webs 2 are fitted on the permanent magnet 1 in such a way that a cutout 3 is positioned opposite each iron web 2 on the other side of the permanent magnet 1, the toothed modules 6 can be joined together without any lateral offset.

FIG. 6 shows a further toothed module 6 according to the invention. With this toothed module 6, the iron webs 2 overlap one another on both sides. Cutouts 3 are located on both sides between the iron webs 2. A coil 5 surrounds the iron webs 2. Permanent magnets 14 are filled on that face of the toothed module 6 which faces the air gap 18 between the toothed module 6 and the secondary part 9. Said permanent magnets are polarized at right angles with respect to the air gap 18. Each permanent magnet 14 is located on the face which faces the air gap 18 between the toothed module 6 and the secondary part 9 on a side facing the iron webs.

FIG. 5 shows a permanent-magnet synchronous segment motor 13 with a secondary part 9 which is free of permanent magnets, the primary part 12 of said motor comprising toothed modules 6 according to the invention. In FIG. 5, the secondary part 9 is in the form of an external rotor. As can be seen in this exemplary embodiment, the toothed modules 6 are in this case joined together next to one another so that those ends of the toothed modules 6 which point towards the curved secondary part 9 follow the curvature of the secondary part 9. The secondary part 9 is constructed from a structure consisting of iron with teeth 11 pointing towards the primary part 12. In this case, an air gap 18 is provided between the primary part 12 and the secondary part 9. As a result of the fact that the iron webs 2 are fitted on the permanent magnet 1 in such a way that a cutout 3 is positioned opposite each iron web 2 on the other side of the permanent magnet 1, the toothed modules 6 can be joined together without any lateral offset.

FIG. 6 shows a further toothed module 6 according to the invention. With this toothed module 6, the iron webs 2 overlap one another on both sides. Cutouts 3 are located on both sides between the iron webs 2. A coil 5 surrounds the iron webs 2. Permanent magnets 15 are fitted on that face of the toothed module 6 which faces the air gap 18 between the toothed module 6 and the secondary part 9. Said permanent magnets are polarized at right angles with respect to the air gap 18. Each permanent magnet 14 is located on the face which faces the air gap 18 between the toothed module 6 and the secondary part 9 on a side facing the iron webs.

A toothed module 6 as shown in FIG. 1 can in addition also be formed with permanent magnets 14, so that the toothed module is constructed according to FIG. 1, but in addition has permanent magnets 14 on the side facing the air gap 18.

FIG. 7 shows a coil 5 with the coil axis 15. Accordingly, the coil axis 15 of the coil 5 is at right angles with respect to the air gap 18 in the state in which it is installed in the toothed module 6.

What is claimed is:

1. A toothed module assembly for a primary part of a permanent-magnet synchronous motor having at least one secondary part which has at least one section free of permanent magnets and is constructed from a structure made of iron with successive teeth pointing towards the primary part, wherein an air gap is established between the primary part and the secondary part, and wherein the secondary part and the primary part are movable relative to one another in a movement direction, said toothed module assembly comprising:

a first toothed module including a permanent magnet extending in a direction perpendicular to the air gap and having opposing major surfaces, iron webs extending in the direction perpendicular to the air gap and projecting substantially perpendicular from each of the opposing major surfaces of the permanent magnet, with an iron web on one major surface forming a cutout with an adjacent iron web located on the same major surface, said cutout being aligned in the movement direction with a web located on the opposing major surface, a coil encompassing a laminate formed of the corresponding webs and the permanent magnet, said permanent magnet protruding from the coil at least at an air-gap-distal end of the coil in the direction perpendicular to the air gap, wherein a width of the laminate inside the coil is smaller than a width of the laminate outside the coil, and a second toothed module of identical configuration as the first toothed module and placed adjacent to the first toothed module in such a way that the iron web on one side of the first toothed module engages in an air-gap-distal region of the first module with a cutout of an adjacently placed second toothed module in an air-gap-distal region of the second toothed module, to thereby allow the first and second toothed module to form an interdigitated toothed module assembly.

2. The toothed module assembly of claim 1, wherein the permanent magnet is magnetized perpendicularly with respect to the air gap.

3. The toothed module assembly of claim 1, wherein the synchronous motor is a linear motor, said first and second toothed modules form, joined together, the primary part of the linear motor.

4. The toothed module assembly of claim 1, wherein the synchronous motor is a rotary motor, said first and second toothed modules form, joined together, the primary part of the rotary motor.

5. The toothed module assembly of claim 1, wherein the synchronous motor is a segment motor, said first and second toothed modules form, joined together, the primary part of the segment motor.

6. The toothed module assembly of claim 1, wherein the synchronous motor is a torque motor, said first and second toothed modules form, joined together, the primary part of the torque motor.

7. The toothed module assembly of claim 1, wherein the synchronous motor is a toroidal motor, said first and second toothed modules form, joined together, the primary part of the toroidal motor.

8. The toothed module assembly of claim 1, wherein the air-gap-proximal region of the laminate defines a foot.

9. A permanent-magnet synchronous motor, comprising:

at least one primary part;

at least one secondary part spaced from the primary part to define an air gap therebetween and having at least one section free of permanent magnets, said secondary part being constructed from a structure made of iron with successive teeth pointing towards the primary part, wherein the secondary part and the primary part are moveable relative to one another in a movement direction, wherein the primary part includes a first toothed module having a permanent magnet extending in a direction perpendicular to the air gap and having opposing major surfaces, iron webs extending in the direction perpendicular to the air gap and projecting substantially perpendicular from each of the opposing major surfaces of the permanent magnet, with an iron web on one major surface forming a cutout with an adjacent iron web located on the same major surface, said cutout being aligned in the movement direction with a web located on the opposing major surface, and a coil encompassing a laminate formed of the corresponding webs and the permanent magnet, said permanent magnet protruding from the coil at least at an air-gap-distal end of the coil in the direction perpendicular to the air gap, wherein a width of the laminate inside the coil is smaller than a width of the laminate outside the coil, and at least one second toothed module of identical configuration as the first toothed module and laced adjacent to the first toothed module in such a way that the iron web on one side of the first toothed module engages in an air-gap-distal region of the first module with a cutout of an adjacently placed second toothed module in an air-gap-distal region of the second toothed module.

10. The synchronous motor of claim 9, wherein the secondary part is in the form of an internal rotor.

11. The synchronous motor of claim 9, wherein the secondary part is in the form of an external rotor.

12. The synchronous motor of claim 9, wherein the secondary part is constructed from laminate stacks.

13. A method for a modular construction of a primary part of a permanent-magnet synchronous motor having at least one secondary part which has at least one section free of permanent magnets and is constructed from a structure made of iron with successive teeth pointing towards the primary part, wherein an air gap is established between the primary part and the secondary part, and wherein the secondary part and the primary part are movable relative to one another in a movement direction, said method comprising:

providing a plurality of identical toothed modules, each toothed module including a permanent magnet extending in a direction perpendicular to the air gap and having opposing major surfaces, iron webs extending in the direction perpendicular to the air gap and projecting substantially perpendicular from each of the opposing major surfaces of the permanent magnet, with an iron web on one major surface forming a cutout with an adjacent iron web located on the same major surface, said cutout being aligned in the movement direction with a web located on the opposing major surface, a coil encompassing a laminate formed of the corresponding webs and the permanent magnet, said permanent magnet protruding from the coil at least at an air-gap-distal end of the coil in the direction perpendicular to the air gap, wherein a width of the laminate inside the coil is smaller than a width of the laminate outside the coil; and forming a primary part by joining the toothed modules together such that the iron web on one side of one of the toothed modules engages in a cutout of another adjacently placed toothed module to thereby form an interdigitated toothed module assembly.

14. The method of claim 13, further comprising the step of winding a wire onto the toothed module for formation of the coil.

15. The method of claim 13, wherein the coil is plugged onto the toothed module.

16. The method of claim 13, wherein the permanent magnet is formed by magnetizing a magnetizable material disposed on the toothed module.

17. The method of claim 13, further comprising the step of securing the adjacently placed toothed modules that form the interdigitated toothed module assembly to one another.

* * * * *